(12) United States Patent
Ryan (10) Patent No.: US 6,585,410 B1
(45) Date of Patent: Jul. 1, 2003

(54) RADIANT TEMPERATURE NULLING RADIOMETER

(75) Inventor: Robert Ryan, Diamondhead, MS (US)

(73) Assignee: The United States of America as represented by the Administrator of the National Aeronautics and Space Administration, Washington, D.C.

(*) Notice: Subject to any disclaimer, the term of this patent is extended or adjusted under 35 U.S.C. 154(b) by 79 days.

(21) Appl. No.: 09/849,945

(22) Filed: May 3, 2001

(51) Int. Cl.$^7$ ................... G01J 5/52; G01J 5/62
(52) U.S. Cl. ................... 374/130; 374/2; 374/126; 374/129; 374/136; 250/252.1; 250/338.3; 250/351; 359/230
(58) Field of Search ................... 374/131, 130, 374/129, 126, 136, 2, 121, 1; 250/338.3, 338.1, 252.1, 351; 356/43; 359/230

(56) References Cited

U.S. PATENT DOCUMENTS

| | | | | |
|---|---|---|---|---|
| 3,309,881 A | * | 3/1967 | Beerman | 374/2 |
| 3,350,562 A | * | 10/1967 | Flint | 374/126 |
| 3,400,266 A | * | 9/1968 | Yoder et al. | 374/126 |
| 3,586,439 A | * | 6/1971 | Treharne et al. | 374/130 |
| 4,045,670 A | * | 8/1977 | Anderson et al. | 374/129 |
| 4,420,265 A | * | 12/1983 | Everest et al. | 250/338.1 |
| 4,433,924 A | * | 2/1984 | Quinn, III | 374/129 |
| 4,631,406 A | * | 12/1986 | Nakata | 250/338.3 |
| 4,969,748 A | | 11/1990 | Crowley et al. | 374/2 |
| 5,127,742 A | * | 7/1992 | Fraden | 374/130 |
| 5,128,884 A | | 7/1992 | Prager | 374/2 |
| 5,326,172 A | | 7/1994 | Ng | 374/126 |
| 5,709,473 A | | 1/1998 | Sultan et al. | 374/131 |
| 5,988,874 A | | 11/1999 | Rohner | 374/2 |
| 5,993,059 A | | 11/1999 | O'Neill et al. | 374/126 |

FOREIGN PATENT DOCUMENTS

GB    1391226 A   *   4/1975

OTHER PUBLICATIONS

Eyal, O. and Katzir, A., "Temperature measurements utilizing two–bandpass fiber optic radiometry," Opt. Eng. vol. 34 No. 2, pp. 470–473, Feb. 1995.*

Foley, G.M., "High Speed Optical Pyrometer," Rev. Sci. Instr., vol. 41, No. 6, pp. 827–834, Jun. 1970.*

* cited by examiner

Primary Examiner—Diego Gutierrez
Assistant Examiner—Stanley J. Pruchnic, Jr.
(74) Attorney, Agent, or Firm—Randall M. Heald; Gary G. Borda; John G. Mannix (57) ABSTRACT

A self-calibrating nulling radiometer for non-contact temperature measurement of an object, such as a body of water, employs a black body source as a temperature reference, an optomechanical mechanism, e.g., a chopper, to switch back and forth between measuring the temperature of the black body source and that of a test source, and an infrared detection technique. The radiometer functions by measuring radiance of both the test and the reference black body sources; adjusting the temperature of the reference black body so that its radiance is equivalent to the test source; and, measuring the temperature of the reference black body at this point using a precision contact-type temperature sensor, to determine the radiative temperature of the test source. The radiation from both sources is detected by an infrared detector that converts the detected radiation to an electrical signal that is fed with a chopper reference signal to an error signal generator, such as a synchronous detector, that creates a precision rectified signal that is approximately proportional to the difference between the temperature of the reference black body and that of the test infrared source. This error signal is then used in a feedback loop to adjust the reference black body temperature until it equals that of the test source, at which point the error signal is nulled to zero. The chopper mechanism operates at one or more Hertz allowing minimization of 1/f noise. It also provides pure chopping between the black body and the test source and allows continuous measurements.

28 Claims, 6 Drawing Sheets

RADIANT TEMPERATURE NULLING RADIOMETER

ORIGIN OF THE INVENTION

The invention described herein was made in the performance of work under a NASA contract and is subject to the provisions of Section 305 of the National Aeronautics and Space Act of 1958, as amended, Public Law 85–568 (72 Stat. 435; 42 U.S.C. §2457).

BACKGROUND OF THE INVENTION

1. Field of the Invention

The present invention relates in general to a self-calibrating radiometer for non-contact measurement of the radiant temperature of an object.

2. Description of the Background Art

The measurement of radiant temperature is important to many science and industrial applications. Radiant temperature is the temperature of an object inferred from the gray body emission of the surface under study. For many problems, it is desirable to measure radiant temperature with an accuracy and precision better than 0.1K. In practice, it is difficult to routinely achieve this level of accuracy or precision with commonly used techniques (i.e. without routine calibration). An interesting and important remote sensing application requiring this level of accuracy is global warming assessments using sea surface temperatures inferred from the radiant temperature. Conversely, water bodies, such as lakes, reservoirs and others with in-situ surface monitoring temperatures, can be used to calibrate airborne and satellite infrared remote sensing systems. Water and other opaque liquids can also be useful for calibrating infrared instruments in the laboratory. In cases where a large uniform surface is needed, a liquid such as water can make an excellent calibration source.

The following characteristics for water surfaces are important in the discussions that follow. Water is 99% absorbing at 100 microns thick in the 8–12 micron spectral region; the emissivity of pure water is approximately 0.986 across the 8–12 micron spectral region; and the skin surface temperature can be different from bulk temperature by as much as 1K. Since the effective water thickness is only a fraction of a millimeter and its surface temperature can be significantly different from the bulk temperature, it is difficult to use contact measurement techniques to infer the surface temperature. This limitation can be minimized in some cases with significant stirring or agitation of the liquid's surface, if practical. However, a more desirable solution is to employ a non-contact radiant temperature measuring technique.

Non-contact methods using infrared radiometer techniques, such as Long Wave Infrared (LWIR) 8–12 micron region, are among the best techniques for determining the skin surface temperature of remotely sensed surfaces and water bodies. These techniques, however, are usually accurate to about 1K because of drifts in the radiometer and its electronics. The accuracy can be improved with routine measurements against a known temperature source, such as a black body. Black bodies with 0.1K or better temperature accuracy and precision can be achieved by many different approaches. In general, one needs two black body temperature calibrations covering the desired temperature range to account for both offset and gain drifts. Even more sources may be necessary if the detection system is nonlinear. However, most radiometers do not have built-in calibration sources or other methods to correct for drifts in offsets and gains. If they do, it is usually only one source, and thus only accounts for offsets. This is usually because black bodies are expensive and can draw many watts. For field portable instruments, the added expense and power demands are not very desirable. Commercially available radiometers are also typically designed to provide temperature updates every few seconds, which is overkill for many objects with large thermal inertia. For example, for water and liquid bodies with long thermal time constants, temperature measurements need to be updated only once every few minutes.

In the microwave region, self-calibrating radiometers have been constructed for nearly 50 years. The operational principle of such a device is as follows. An antenna collects microwave radiation from a source under study. A detector is synchronously switched between the signal from the antenna and a known RF or microwave source referred to as the noise source. This noise source can be generated artificially or through a natural process, such as Johnson noise. If Johnson noise of a resistance is used, the temperature of the resistor can be adjusted to change its resistance and null the signal. The signal strength can then be defined in terms of the temperature of the resistor, which is then a measure of the radiant temperature of the source, if the antenna properties are well understood. This switching process produces an alternating current (AC) signal. The AC signal offers significant advantages over direct current (DC) measurements because it can be averaged for extended periods to produce a high signal-to-noise ratio (SNR). In contrast, DC signals typically cannot be averaged over extended periods due to 1/f noise and other low frequency drifts. The AC signal is synchronously rectified and integrated to produce a DC signal that is proportional to the difference between the signal detected by the antenna and that of the noise source. This difference signal is then used in a feedback loop to adjust the noise source until it is approximately equal to the signal from the antenna, which is referred to as the null condition. A voltage proportional to the noise source strength is then used to define the antenna signal.

The elegance of this approach is that one calibration source cancels both offset and gain drifts. Although this technique works well in the microwave and RF, it will not work for the infrared or any other spectral region where antenna and standard RF techniques do not work. While similar switching techniques have been employed with infrared detection systems, the switching has been done at very low frequencies, and non-continuously. For example, an infrared radiating surface will be observed for a minute and then the detector will be switched or moved so that a black body will be observed for a minute. The black body is then adjusted to equal the surface radiation. This however creates significant data gaps during the switching between the surface and the black body, and requires some means to prevent detection of radiation from sources other than the black body and the test source during switching. A need therefore remains for a low power, self-calibrating infrared radiometer that can be used for making radiant temperature measurements of objects, such as water bodies, and provide a measurement accuracy and precision on the order of 0.1K or better.

SUMMARY OF THE INVENTION

The present invention fulfills the foregoing need through provision of a radiometer that employs a black body source as a temperature reference, an optomechanical mechanism, e.g., a chopper, to switch back and forth quickly and contiguously between measuring the temperature of the black body source and that of a test source or object, and an infrared detection technique. More particularly, the radiometer functions by measuring infrared radiance of both the test and the reference black body sources; adjusting the temperature of the reference black body so that its radiance is equivalent to the test source; and, measuring the temperature of the reference black body at this point to determine the radiative temperature of the test source.

To achieve this functionality, the radiation from the reference black body source and the test object or source is detected by an infrared detector that converts the detected radiation to an AC electrical signal. The chopper is positioned between the two radiation sources and the infrared detector, and, through a movable set of optics, alternates back and forth between exposing the detector first to only a first of the two sources, second to both of the sources, and third, to only the second of the two sources. In this manner, the chopper provides continuous radiation to the detector so that the radiometer can thereby generate a continuous stream of measurement data. A reference signal that monitors the motion of the chopper is sent along with the AC detector signal to an error signal generator that can be a synchronous detector, such as a Lockin amplifier. The synchronous detector creates a precision rectified error signal that is approximately proportional to the difference between the temperature of the reference black body and that of the test object or source.

The error signal is used in a feedback loop that includes a temperature-modifying device, such as a thermoelectric cooler, to adjust the reference black body temperature until it equals that of the test source, at which point the error signal is nulled to zero. A precision temperature monitor measures the reference black body temperature at this null point, which is then an accurate estimate of the radiant temperature of the test object or source under study.

The advantages of the radiometer design include high accuracy, low power, self-calibration and nonlinearity compensation with a single reference black body source. Regarding the accuracy, since contact type temperature sensors with long-term stability and accuracy better than 0.1K are routinely available, the same level of accuracy can be achieved with the present invention since the radiant temperature of the test source is estimated from a contact temperature measurement of the reference black body source. Further, the feedback loop minimizes any nonlinearities, offset and gain drifts in the infrared detection process so that additional reference black bodies are not required to compensate for these nonlinearities. The use of the low power chopping mechanism results in the radiometer having extremely low power requirements in cases of near ambient temperature measurements. The periodic switching at one or more Hz between the reference and test sources produces a periodic signal that can be integrated with little impact of 1/f noise, enabling the use of room temperature detectors to achieve Noise Equivalent Delta Temperature (NEDT) of a few mk with several seconds of integration. Additionally, switching at these frequencies allows near continuous measurements of the test source, while a pure chopping arrangement of the chopper, discussed in further detail below, eliminates any data gaps between test source and reference black body source measurements. Finally, the radiometer is self-calibrating through contact thermometer calibration standards.

In a preferred embodiment of the invention, the chopper is implemented using an electromechanical resonator to oscillate a prism shaped reflector. The desired features of the chopper include pure chopping, low power (few mw), high reliability (millions of cycles) and one Hz or greater chopping frequency. Pure chopping means that the infrared radiation that the detector sees comes only from the reference black body source and the test source under study. It is also desirable that during part of the chopping cycle, the detector system sees only the reference black body source and during another part of the chopping cycle, the detector system sees only the test source under study. Typically, choppers block the radiation, but this is not desirable in the present invention since the object that does the blocking itself will radiate into the detector system, thus inducing an unwanted signal.

The resonator achieves the foregoing goals through use of an electromagnet assembly that drives a pair of metal leaf springs back and forth, thus also causing the reflector, which is attached to the leaf springs, to oscillate. As the reflector oscillates, the two angled reflector surfaces direct radiation received from the test source and the reference black body to the infrared detector. At the two extremes of the oscillatory motion, only radiation from one or the other of the two sources is reflected toward the detector. At the mid-point of the motion, radiation is received by the detector from both of the sources. Since the chopper is implemented by an electromechanical resonator, it behaves like a crystal watch using minimal power. The use of steel or another shim material in the leaf-springs to form a high Q resonator will allow the resonator system to oscillate with less than a few mw of power. Keeping,the shim material within the elastic limit of the material will allow the system to oscillate potentially millions of cycles without failure.

BRIEF DESCRIPTION OF THE DRAWINGS

The features and advantages of the present invention will become apparent from the following detailed description of a number of preferred embodiments thereof, taken in conjunction with the accompanying drawings, in which.

DETAILED DESCRIPTION OF THE PREFERRED EMBODIMENTS

Figure 1:
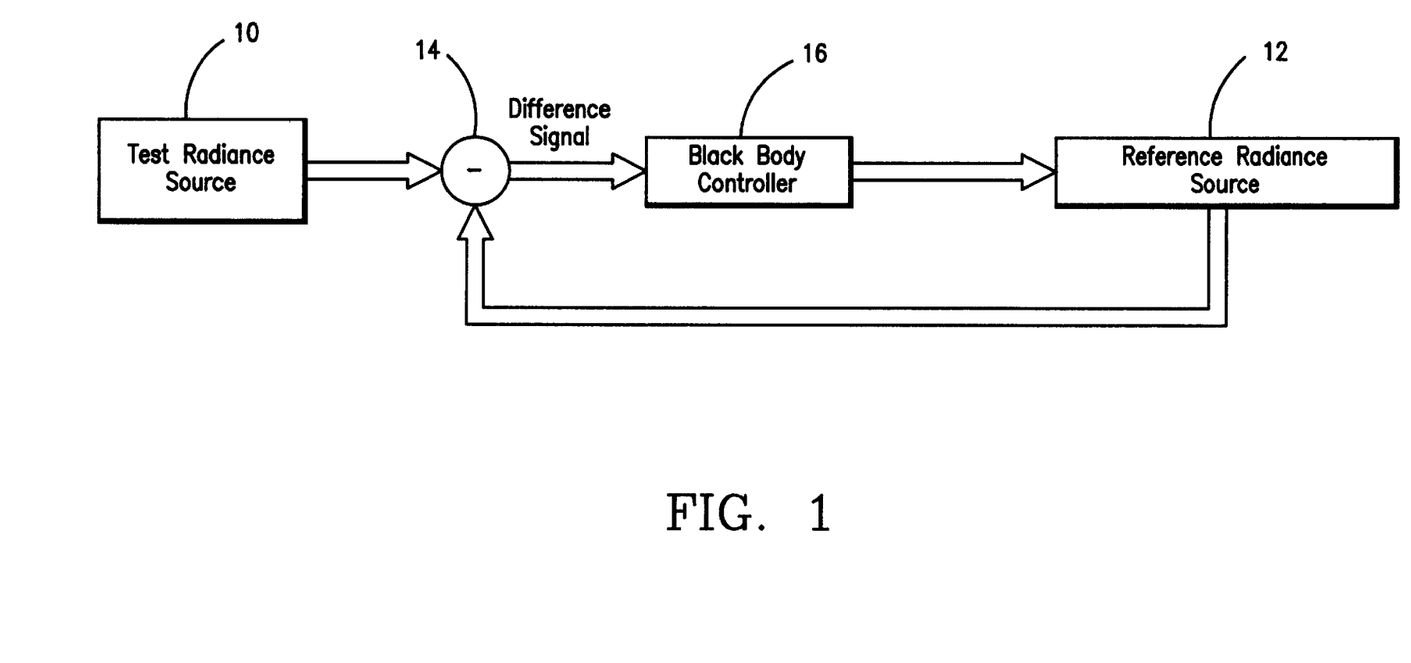
FIG. 1 is a schematic block diagram illustrating the basic operational principle of the present invention.

With reference to the block diagram of FIG. 1, the principle of operation of the preferred embodiments of the present invention is illustrated. The radiant temperature of a test radiance source or object 10 is to be determined with a high accuracy. To achieve this, the radiant temperature of the test radiance source 10 is compared to the radiant temperature of a reference radiance source 12 (e.g., a black body)

with a difference detector 14. The difference signal that is generated by the detector 14 is employed as an error signal to control a black body controller 16 that heats or cools the reference radiance source 12 as required until the signal generated by the difference detector 14 is nulled. At this point, the temperature of the test radiance source 10 and the reference radiance source 12 are known to be equal to one another. It then becomes a simple matter to make an accurate determination of the temperature of the test radiance source 10 by measuring the temperature of the reference radiance source 12 with a high accuracy contact type temperature sensor. The use of the difference detector 14 inherently compensates for variations in offset and gain since such variations are effectively canceled by virtue of the difference calculation.

Figure 2:
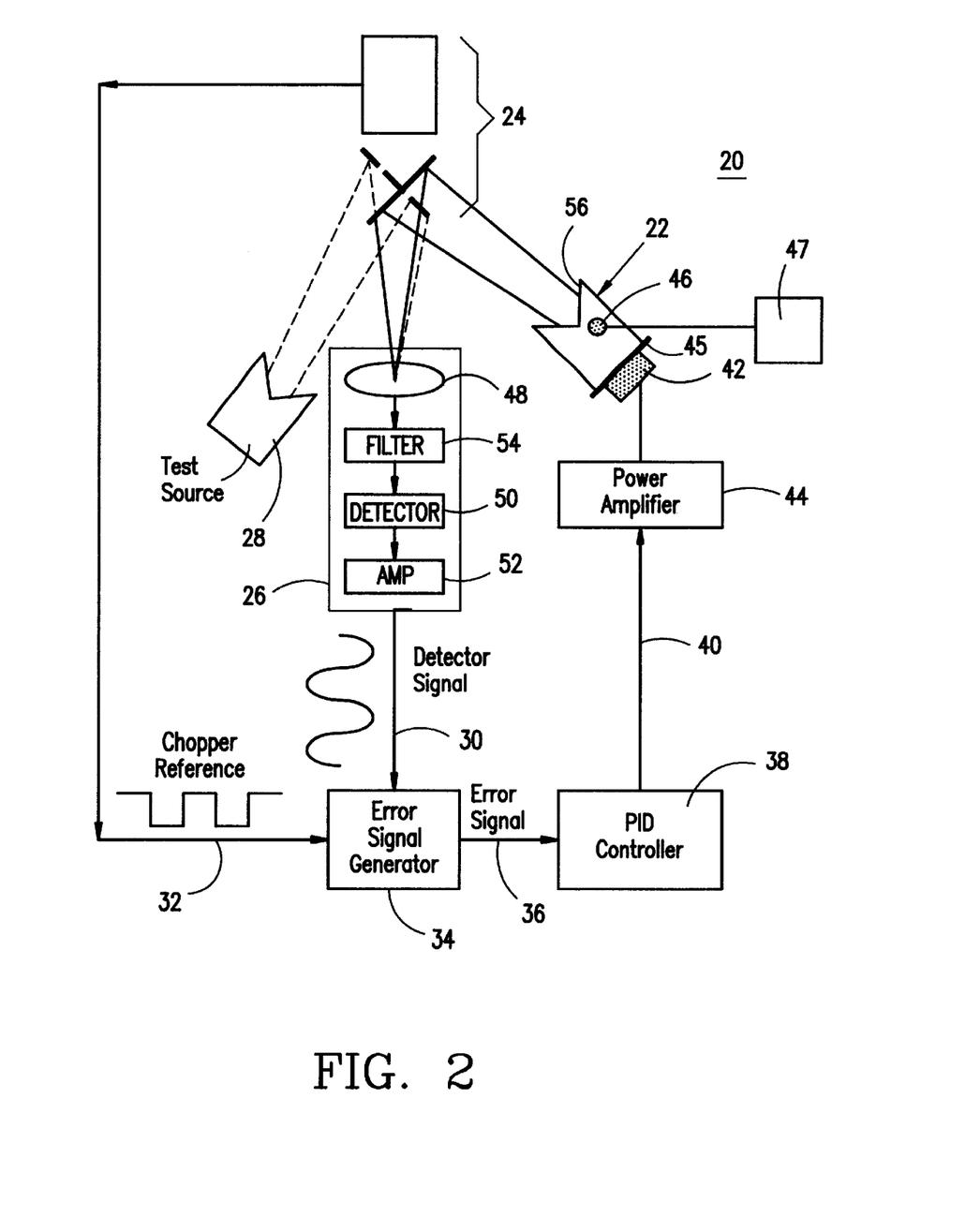
FIG. 2 is a schematic block diagram of a radiometer that is constructed in accordance with a preferred embodiment of the present invention.

A block diagram of a nulling radiometer 20 that is constructed in accordance with a first preferred embodiment of the invention is illustrated in FIG. 2. The radiometer 20 includes three key components: a reference black body source 22, an optomechanical chopper 24 and an infrared detection system 26. The chopper 24 moves back and forth in such a manner that the infrared detection system 26 alternately receives radiation from the reference black body source 22 and from a test source 28. The radiation that is detected by the infrared detection system 26 is converted thereby to an AC electrical detector signal 30. A reference signal 32 that monitors the motion of the chopper 24 is sent along with the AC detector signal 30 to an error signal generator 34, which is preferably a synchronous detector, such as a Lockin amplifier.

The error signal generator 34 creates a precision rectified error signal 36 that is approximately proportional to the difference in temperature between the reference black body source 22 and the test source 28. The error signal 36 is then used in a feedback loop to adjust the reference black body source 22 temperature. Many different types of feedback loops are possible, but in this embodiment, a Proportional Integral Derivative (PID) controller 38 is used. The PID controller 38 generates a feedback signal 40 that is used to drive a temperature control element, such as a thermoelectric cooler 42, through a power amplifier 44. The thermoelectric cooler 42 is interfaced to the reference black body source 22 through a heat sink 45. A precision contact-type temperature monitor 46 and associated measurement circuit 47 are provided that measure the reference black body temperature, preferably with an accuracy of 0.1K or better. Once the radiometer stabilizes in a nulling condition, this reference black body temperature becomes an estimate of the radiant temperature of the test source 28, and this estimate's accuracy is the same level as that of the temperature monitor 46. The feedback loop minimizes any nonlinearities, offset and gain drifts in the infrared detection process. Gain drifts could be any error source that is multiplicative in nature, such as components changing transmission or reflection because of surface contaminants, amplifier drift and detector aging.

The infrared detection system 26 consists of a lens 48, a detector 50 and an amplifier 52. The lens 48 collects electromagnetic radiation in the spectral region of interest and beyond. A reflective element can be used if desired. Since the optics are primarily used to collect radiation, f/1 or faster optics can be used in many cases. The focal length for many applications can be kept under a centimeter so that the overall lens diameter can be a centimeter or less. The exact focal length depends upon the operation and working distance. An optional filter 54 can be used to restrict the spectral response to the spectral region of interest. The filter 54 is positioned between the lens 48 and the detector 50, and typically would be a dielectric stack filter, but any filtering processing that restricts the detection region could be used. The detector 50 is preferably a room-temperature infrared detector, such as a pyroelectric detector, and is used to measure the power collected by the lens 48. If pyroelectric, the detector 50 responds only to AC signals. Other types of detectors can be used, but most of these devices are required to be cooled to cryogenic temperatures for operation. Cooled detectors are more sensitive but require more logistics for their operation. In cases where temporal response can be traded off for sensitivity, un-cooled detectors are preferable.

The reference black body source 22 can be relatively small with an active area under 1 cm$^2$. Although a theoretical black body does not exist, gray bodies approaching the ideal black body behavior can be constructed. For all discussions herein, gray bodies that have near-ideal black body properties are referred to as black bodies. The required properties of the reference black body source 22 for the applications discussed include: emissivity approaching unity (0.99 or greater) and temperature knowledge and control to better than 0.1K. The reference black body source 22 can be one of several types that can meet this requirement using high thermal conductivity materials, such as copper, fashioned into flat, corrugated, honeycomb or cone surfaces 56. The surfaces 56 of the reference black body source 22 need to be coated with high emissivity paint or treated to make a high emissivity surface. Emissivities approaching or exceeding 0.99 can be achieved with many of the above approaches without too much difficulty. A high thermal conductivity material, such as copper, with standard temperature control elements, such as the thermoelectric cooler 42 and its control system topologies, can meet 0.1K accuracy. If even greater accuracy is desired, the reference black body source 22 can make use of oil bath or water bath black body cones that can achieve or exceed 0.01K accuracy. The type of black body chosen is mainly driven by the response time desired and cost.

The desired features of the chopper 24 include pure chopping, low power (few mw), high reliability (millions of cycles) and one Hz or greater chopping frequency. Pure chopping means that the infrared radiation that the detector 50 sees comes only from the reference black body source 22 and the test source 28 under study. It is also desirable that during part of the chopping cycle, the detector system 26 sees only the reference black body source 22 and during another part of the chopping cycle, the detector system 26 sees only the test source 28 under study. Typically, choppers block the radiation, but this not desirable in the present invention since the object that does the blocking itself will radiate into the detector system 26, thus inducing an unwanted signal.

Figure 3:
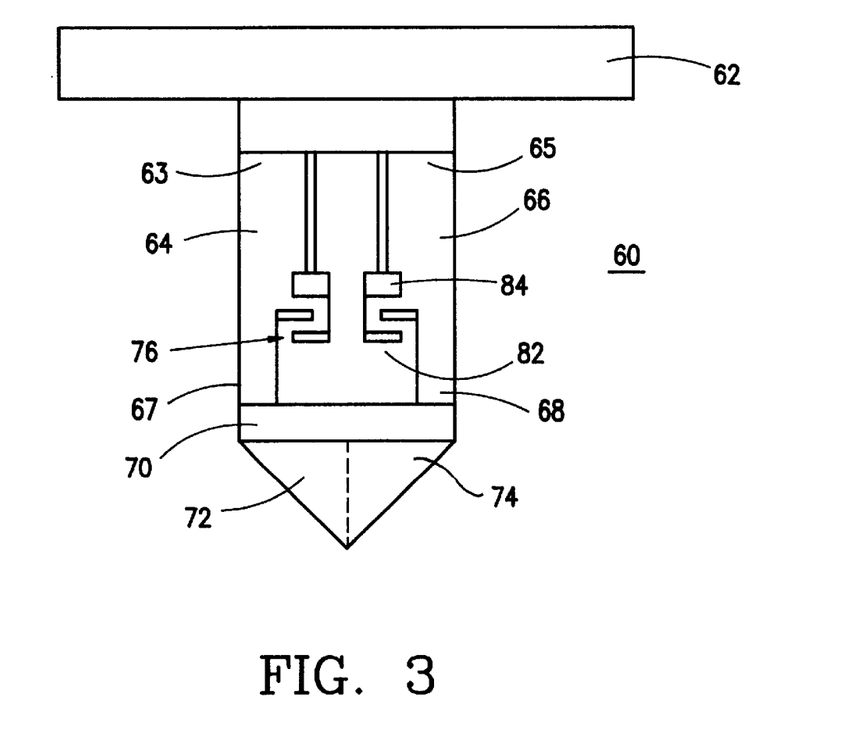
FIG. 3 is a schematic block diagram of an electromechanical resonator that is employed as an optical chopper in the preferred embodiments.

To overcome this problem in the preferred embodiment, the chopper 24 is implemented with a leaf-spring type electromechanical resonator 60 as illustrated in FIG. 3. The resonator 60 includes a frame 62 to which are attached at first, top ends 63 and 65 thereof, first and second leaf springs 64 and 66. Attached to second, bottom ends 67 and 68 of the leaf springs 64 and 66 is a reflector 70. The reflector 70 includes first and second reflective surfaces 72 and 74 that are positioned at an angle relative to one another in the shape of a prism. It will be understood that a set of mirrors in a geometry similar to the prism will also suffice. Any infrared reflective material can be used for the reflective surfaces 72 and 74, including, e.g., aluminum, gold and silver. The leaf springs 64 and 66 are preferably made out of steel, brass or some other tensile metal shims, and are driven back and forth by an electromagnet assembly 76.

Figure 4A:
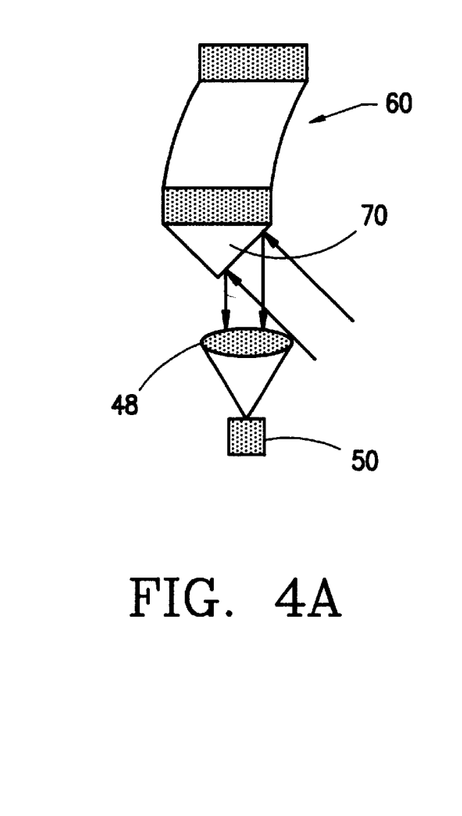
FIGS. 4A–4C are schematic illustrations of three operational positions of the electromechanical resonator of FIG. 3.
Figure 4B:
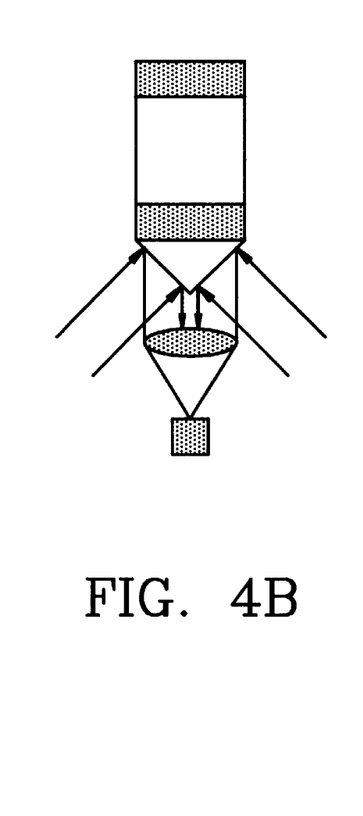
Figure 4C:
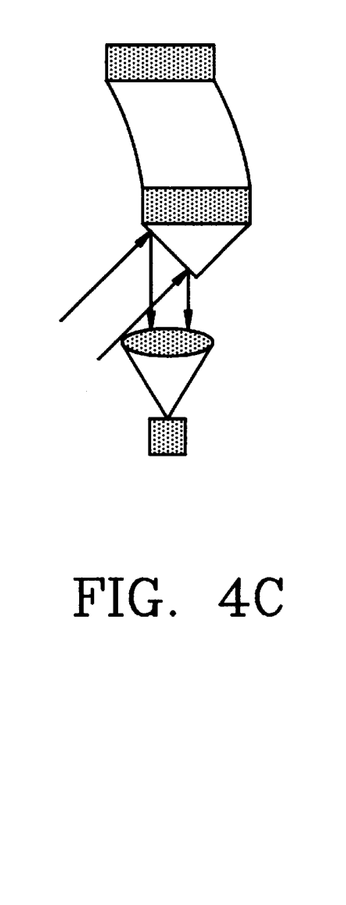

As the leaf springs 64 and 66 move, the reflector 70 moves parallel to the top surface so that the signal received by the detector 50 is thus divided between the test source 28 and the reference black body source 22, minimizing the view to other objects. This isolation of viewing objects is illustrated in FIGS. 4A–4C, which show the relative positions of the reflector 70 during three different portions of the resonator's optical chopping cycle. In FIG. 4A, during a first portion of the cycle, the detector 50 is exposed to radiation from only the reference black body source 22. During a second portion of the cycle as illustrated in FIG. 4B, the detector 50 is exposed to radiation from both the reference black body source 22 and the test source or object 28, and during a third portion of the cycle, the detector 50 is exposed to radiation from only the test source or object 28 as illustrated in FIG. 4C.

Figure 5:
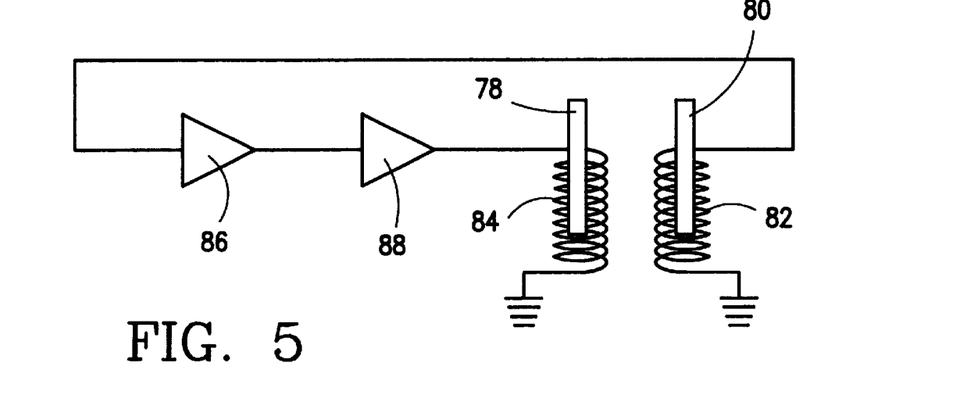
FIG. 5 is a schematic block diagram of a control circuit for the electromechanical resonator of FIG. 3.

The schematic of a typical circuit for the electromagnet assembly 76 is shown in FIG. 5. A pair of permanent magnets (alnico or rare earth) 78 and 80 is provided, each of which move between a corresponding one of two coils, a pickup coil 82 and a drive coil 84. A signal from the pickup coil 82 that is created by the motion of the permanent magnet 80 is amplified and phase shifted by a power amplifier and feedback network 86 and 88 that create a positive feedback loop. The electromechanical resonator 60 oscillates at the natural resonance of the system, which can be adjusted by changing the length and thickness of the shims that make up the leaf springs 64 and 66, along with the total mass being moved. Since the chopper 24 is implemented by the electromechanical resonator 60, it behaves like a crystal watch using minimal power. The use of steel or another shim material to form a high Q resonator will allow a system to oscillate with less than a few mw of power. Keeping the shim material within the elastic limit of the material will allow the system to oscillate potentially millions of cycles without failure. It should be understood that other forms of a chopper that use a resonance to move a prism or mirrors setup like the reflector 70 can also be employed to serve the same function.

Figure 6:
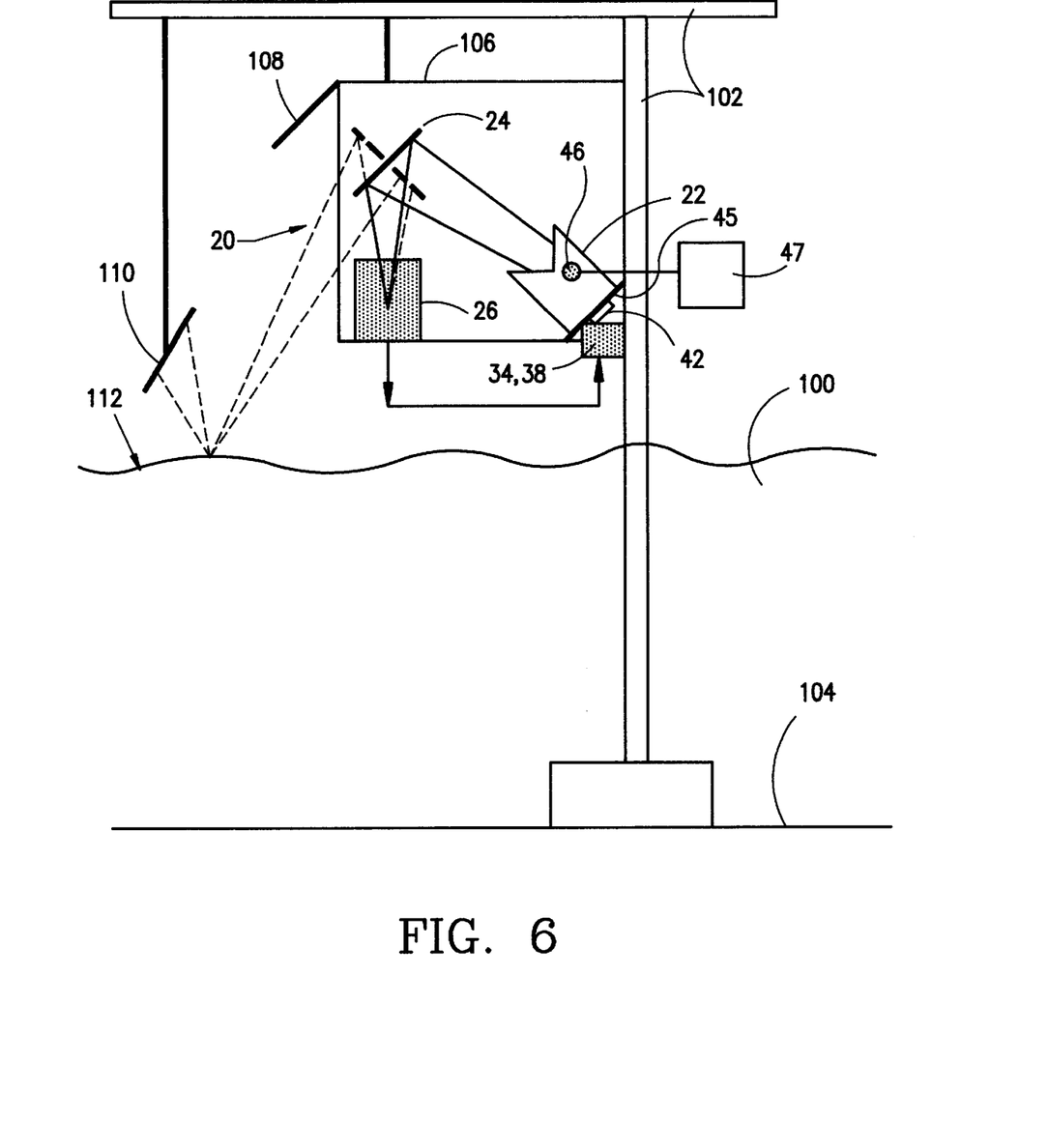
FIG. 6 a schematic illustration of another preferred embodiment of the invention that is specifically designed for measuring the surface temperature of a body of water; and, FIG. 7 is a graph illustrating expected performance characteristics of the preferred embodiments of the present invention.

With reference to FIG. 6, an embodiment of the present invention is illustrated that is specifically configured for measuring the skin surface temperature of liquid, such as a water body 100. The radiometer 20 is attached to a support structure 102 that is either anchored to the bottom 104 or floats in the water body 100. For outside conditions, the radiometer 20 is protected from the elements with a housing 106 and a rain baffle 108. To avoid measurement inaccuracies, a sky emission baffle 110 is used to prevent the sky emissions from being able to reflect off of the surface 112 of the water body 100, and add to the emitted infrared radiation there from. Use of the sky emission baffle is preferred because experiments have shown a 0.5K difference in radiant temperature measurements between a cloudy and a clear sky in the long-wave infrared region. The baffle 110 is kept near ambient temperature, thus minimizing the error associated with a variable sky. The reference black body heat sink 45 for the thermal control element, such as the thermoelectric cooler 42, is kept near the bulk temperature of the water. Since skin surface temperature is near the bulk temperature, the reference black body source 22 needs to be adjusted only a few degrees from the temperature of the heat sink 45. This results in very low-power operation. With carefully selected optical components, the black body surface area can be kept near 1 $cm^2$ or less. Estimates of the convection, radiative and conductive losses are less than a watt, resulting in a very low-power black body.

Figure 7:
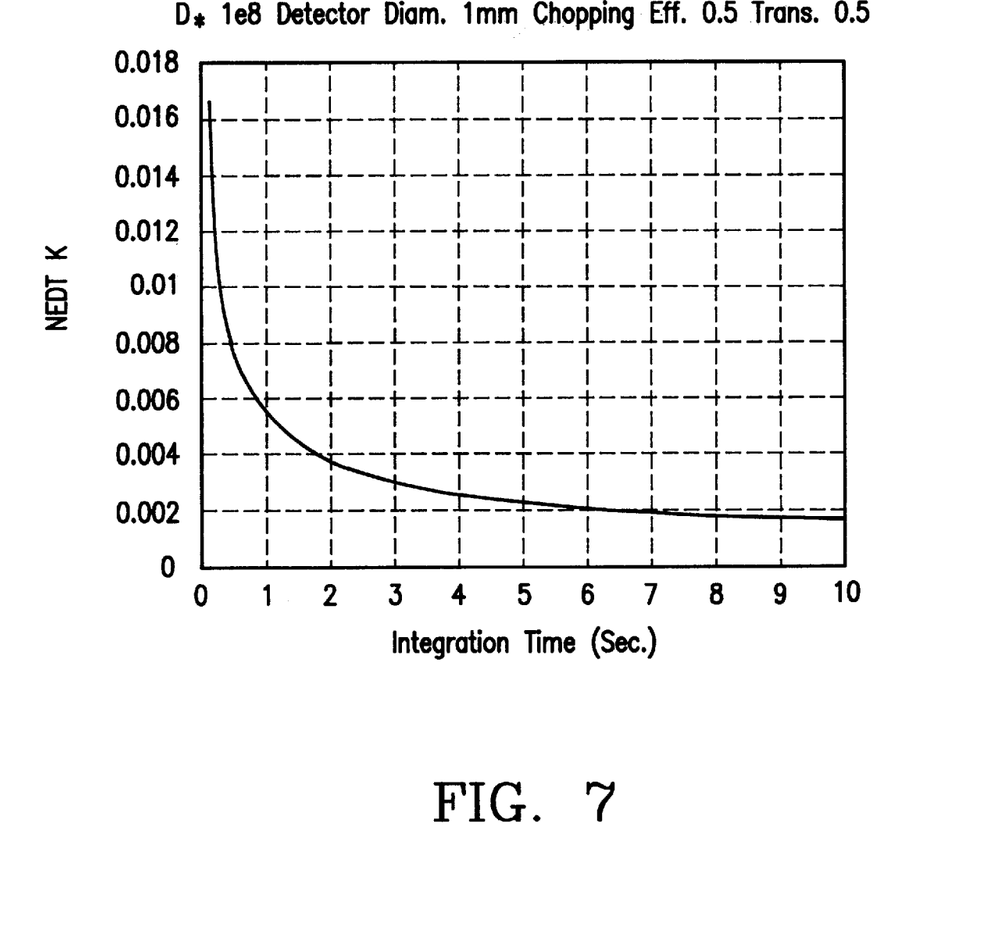

An analysis of the capabilities of the infrared detection system 26 has also demonstrated a measurement precision that is notably better than required. The graph of FIG. 7 illustrates the typical expected performance of the infrared detection system 26 if it includes an f/1 optical system, a typical pyroelectric detector with a D* 1e8, a transmission of 50%, and a chopping efficiency of 50%. The chopping efficiency is the fraction of the signal at the fundamental frequency. FIG. 7 shows the effective temperature precision in terms of the Noise Equivalent Delta Temperature (NEDT) as a function of integration time. The SNR improves with the square root inverse of the integration time for a system not limited by 1/f noise. The graph shows that with several seconds of integration time, the precision will approach 2 mK. A NEDT of 10–20 mK will be more than adequate for most applications.

Although the invention has been disclosed in terms of a number of preferred embodiments, it will be understood that numerous variations and modifications could be made thereto without departing from the scope of the invention as defined in the following claims.

What is claimed is:

1. A radiometer for measuring the radiant energy of an object to determine the object's surface radiant temperature comprising:

a reference black body source which generates infrared radiation that is proportional in magnitude to a magnitude of the surface radiant temperature of the reference black body source;

an infrared detector for receiving infrared radiation and generating an electrical output signal that is proportional to a magnitude of the radiation received thereby;

an optical chopping mechanism positioned to receive first infrared radiation from said reference black body source and second infrared radiation from an object whose surface radiant temperature is to be determined, and selectively direct said first and second radiation toward said detector in a cyclical, repeating manner, said optical chopping mechanism comprising an electromechanical resonator that includes a movable reflector having first and second infrared reflective surfaces for receiving said first radiation and said second radiation, respectively, and directing said first radiation and second radiation toward said detector;

an error signal generator for receiving said detector output signal and a reference signal generated by said chopping mechanism, and generating an error signal that is proportional to a difference in magnitude between said first infrared radiation generated by said reference black body source and said second infrared radiation generated by said object;

a temperature controller for receiving said error signal and adjusting the temperature of said reference black body source in response to said error signal until said error signal is nulled and the temperature of said reference black body source equals the temperature of said object; and, a temperature sensor for sensing the temperature of said reference black body source to determine the temperature of said object when said error signal is nulled.

2. The radiometer of claim 1, wherein said electromechanical resonator includes a movable leaf spring mechanism for supporting said movable reflector and an electromagnet assembly for oscillating said leaf spring mechanism and thereby moving said reflector back and forth.

3. The radiometer of claim 2, wherein said electromechanical resonator is positioned such that during a first portion of an optical chopping cycle, said detector receives only said first radiation from said first reflective surface, during a second portion of an optical chopping cycle, said detector receives said first radiation from said first reflective surface and said second radiation from said second reflective surface, and during a third portion of an optical chopping cycle, said detector receives only said second radiation from said second reflective surface.

4. The radiometer of claim 1, wherein said infrared detector comprises a pyroelectric infrared radiation detector.

5. The radiometer of claim 1, wherein said error signal generator comprises a synchronous detector.

6. The radiometer of claim 5, wherein said synchronous detector comprises a Lockin amplifier.

7. The radiometer of claim 1, wherein said temperature controller includes a thermoelectric cooler interfaced to said reference black body source.

8. The radiometer of claim 1, wherein said temperature sensor comprises a contact temperature sensor that is disposed on a surface of said reference black body source.

9. The radiometer of claim 1, further including a housing containing said reference black body source, infrared detector, optical chopping mechanism, error signal generator, temperature controller and temperature sensor, and a support for supporting said housing above a body of water whose surface temperature is to be measured using said radiometer.

10. The radiometer of claim 9, further including a baffle for preventing sky emissions from reflecting off of said surface and being detected by said detector.

11. A method for measuring the temperature of an object using analysis of infrared radiation emitted by said object comprising the steps of:
   providing a reference black body source which generates infrared radiation that is proportional in magnitude to a magnitude of the surface radiant temperature of the reference black body source;
   providing an infrared detector for receiving infrared radiation and generating an electrical output signal that is proportional to a magnitude of the radiation received thereby;
   directing first radiation generated by said black body reference source, and second infrared radiation generated by said object whose temperature is to be measured, to an optical chopping mechanism, said optical chopping mechanism comprising an electromechanical resonator including a movable reflector having first and second infrared reflective surfaces for receiving said first infrared radiation from said reference black body source and said second infrared radiation from said object whose surface temperature is to be determined, respectively;
   oscillating said optical chopping mechanism in such a manner that said reflector alternately directs said first radiation and said second radiation to said detector in a cyclical, repeating manner;
   analyzing the output signal generated by said infrared detector to determine a difference between the magnitudes of said first radiation and said second radiation;
   adjusting the temperature of said reference black body source until the magnitudes of said first radiation and said second radiation are equal to one another; and
   measuring the temperature of said black body reference source when the magnitudes of said first and second radiation are equal to one another to thereby determine the temperature of said object.

12. The method of claim 11, wherein said optical chopping mechanism is oscillated at a frequency of one or more Hertz.

13. A radiometer for measuring the radiant energy of an object to determine the object's surface radiant temperature comprising:
   a reference black body source which generates infrared radiation that is proportional in magnitude to a magnitude of the surface radiant temperature of the reference black body source;
   an infrared detector for receiving infrared radiation and generating an electrical output signal that is proportional to a magnitude of the radiation received thereby;
   an optical chopping mechanism positioned to receive first infrared radiation from said reference black body source and second infrared radiation from an object whose surface radiant temperature is to be determined, and selectively direct said first and second radiation toward said detector in a cyclical, repeating manner, said optical chopping mechanism being positioned such that during a first portion of an optical chopping cycle, said chopping mechanism directs only said first radiation toward said detector, during a second portion of an optical chopping cycle, said chopping mechanism directs both said first and second radiation toward said detector, and during a third portion of an optical chopping cycle, said chopping mechanism directs only said second radiation toward said detector;
   an error signal generator for receiving said detector output signal and a reference signal generated by said chopping mechanism, and generating an error signal that is proportional to a difference in magnitude between said first infrared radiation generated by said reference black body source and said second infrared radiation generated by said object;
   a temperature controller for receiving said error signal and adjusting the temperature of said reference black body source in response to said error signal until said error signal is nulled and the temperature of said reference black body source equals the temperature of said object; and,
   a temperature sensor for sensing the temperature of said reference black body source to determine the temperature of said object when said error signal is nulled.

14. The radiometer of claim 13, wherein said infrared detector comprises a pyroelectric infrared radiation detector.

15. The radiometer of claim 13, wherein said error signal generator comprises a synchronous detector.

16. The radiometer of claim 15, wherein said synchronous detector comprises a Lockin amplifier.

17. The radiometer of claim 13, wherein said temperature controller includes a thermoelectric cooler interfaced to said reference black body source.

18. The radiometer of claim 13, wherein said temperature sensor comprises a contact temperature sensor that is disposed on a surface of said reference black body source.

19. The radiometer of claim 13, further including a housing containing said reference black body source, infrared detector, optical chopping mechanism, error signal generator, temperature controller and temperature sensor, and a support for supporting said housing above a body of water whose surface temperature is to be measured using said radiometer.

20. The radiometer of claim 19, further including a baffle for preventing sky emissions from reflecting off of said surface and being detected by said detector.

21. A method for measuring the temperature of an object using analysis of infrared radiation emitted by said object comprising the steps of:

providing a reference black body source which generates infrared radiation that is proportional in magnitude to a magnitude of the surface radiant temperature of the reference black body source;

providing an infrared detector for receiving infrared radiation and generating an electrical output signal that is proportional to a magnitude of the radiation received thereby;

directing first radiation generated by said black body reference source, and second infrared radiation generated by said object whose temperature is to be measured, to an optical chopping mechanism, said optical chopping mechanism including a movable reflector;

oscillating said optical chopping mechanism in such a manner that said reflector alternately directs said first radiation and said second radiation to said detector in a cyclical, repeating manner by moving said reflector back and forth such that during a first portion of an optical chopping cycle, said detector receives only said first radiation from said first reflective surface, during a second portion of an optical chopping cycle, said detector receives said first radiation from said first reflective surface and said second radiation from said second reflective surface, and during a third portion of an optical chopping cycle, said detector receives only said second radiation from said second reflective surface;

analyzing the output signal generated by said infrared detector to determine a difference between the magnitudes of said first radiation and said second radiation;

adjusting the temperature of said reference black body source until the magnitudes of said first radiation and said second radiation are equal to one another; and measuring the temperature of said black body reference source when the magnitudes of said first and second radiation are equal to one another to thereby determine the temperature of said object.

22. The method of claim 21, wherein said optical chopping mechanism comprises an electromechanical resonator with said movable reflector having first and second infrared reflective surfaces for receiving said first infrared radiation from said reference black body source and said second infrared radiation from said object whose surface temperature is to be determined, respectively.

23. The method of claim 22, wherein said electromechanical resonator is oscillated at a frequency of one or more Hertz.

24. A radiometer for measuring the radiant energy of an object to determine the object's surface radiant temperature comprising:

a reference black body source which generates infrared radiation that is proportional in magnitude to a magnitude of the surface radiant temperature of the reference black body source;

an infrared detector for receiving infrared radiation and generating an electrical output signal that is proportional to a magnitude of the radiation received thereby;

an electromechanical resonator including a movable reflector having first and second infrared reflective surfaces for receiving first infrared radiation from said reference black body source and second infrared radiation from an object whose surface temperature is to be determined, respectively, and selectively directing said first and second radiation toward said detector in a cyclical, repeating manner such that during a first portion of an optical chopping cycle, said detector receives only said first radiation from said first reflective surface, during a second portion of an optical chopping cycle, said detector receives said first radiation from said first reflective surface and said second radiation from said second reflective surface, and during a third portion of an optical chopping cycle, said detector receives only said second radiation from said second reflective surface;

a synchronous detector for receiving said detector output signal and a reference signal generated by said chopping mechanism, and generating an error signal that is proportional to a difference in magnitude between said first infrared radiation generated by said reference black body source and said second infrared radiation generated by said object;

a temperature controller for receiving said error signal and adjusting the temperature of said reference black body source in response to said error signal until said error signal is nulled and the temperature of said reference black body source equals the temperature of said object; and, a contact temperature sensor disposed on a surface of said reference black body source for sensing the temperature of said reference black body source to determine the temperature of said object when said error signal is nulled.

25. The radiometer of claim 24, wherein said electromechanical resonator includes a movable leaf spring mechanism for supporting said movable reflector and an electromagnet assembly for oscillating said leaf spring mechanism and thereby moving said reflector back and forth.

26. The radiometer of claim 24, wherein said infrared detector comprises a pyroelectric infrared radiation detector.

27. The radiometer of claim 24, wherein said synchronous detector comprises a Lockin amplifier.

28. The radiometer of claim 24, wherein said temperature controller includes a thermoelectric cooler interfaced to said reference black body source.

* * * * *